US009793979B2

(12) United States Patent
Yakubovitch et al.

(10) Patent No.: US 9,793,979 B2
(45) Date of Patent: Oct. 17, 2017

(54) METHOD AND SYSTEM FOR SWITCHOVER REDUCTION IN ANTENNAS TRACKING SATELLITES

(71) Applicant: Orbit Communication Systems Ltd., Netanya (IL)

(72) Inventors: Azriel Yakubovitch, Kfar-Yona (IL); Peter Bronshtein, Netanya (IL); Stav Gizunterman, Netanya (IL)

(73) Assignee: ORIBT COMMUNICATION SYSTEMS LTD., Netanya (IL)

( * ) Notice: Subject to any disclaimer, the term of this patent is extended or adjusted under 35 U.S.C. 154(b) by 342 days.

(21) Appl. No.: 14/718,138

(22) Filed: May 21, 2015

(65) Prior Publication Data

US 2015/0340762 A1   Nov. 26, 2015

Related U.S. Application Data

(60) Provisional application No. 62/001,662, filed on May 22, 2014.

(51) Int. Cl.
| | |
|---|---|
| *H01Q 3/02* | (2006.01) |
| *H04B 7/185* | (2006.01) |
| *H01Q 3/24* | (2006.01) |
| *H01Q 1/12* | (2006.01) |
| *H01Q 1/34* | (2006.01) |

(52) U.S. Cl.
CPC ......... *H04B 7/18517* (2013.01); *H01Q 1/125* (2013.01); *H01Q 3/24* (2013.01); *H01Q 1/34* (2013.01)

(58) Field of Classification Search
CPC .................................. H01Q 3/24; H01Q 3/26
USPC .......... 342/75, 158, 371, 374, 445; 455/140, 455/277.1
See application file for complete search history.

(56) References Cited

U.S. PATENT DOCUMENTS

| | | | | |
|---|---|---|---|---|
| 5,890,679 | A * | 4/1999 | Chethik | B64G 1/1085 244/158.4 |
| 7,596,350 | B1 * | 9/2009 | Ladrach | H04H 20/74 370/315 |
| 9,026,042 | B1 * | 5/2015 | Nemeth | H04B 7/2048 455/12.1 |
| 2004/0001720 | A1 * | 1/2004 | Krill | H04B 10/118 398/125 |

* cited by examiner

*Primary Examiner* — Dao Phan
(74) *Attorney, Agent, or Firm* — Mark M. Friedman

(57) ABSTRACT

A method for reducing expected switchovers in antennas tracking at least one satellite. The method predicts an operation of a predetermined number of subsets of antennas during a simulated time interval. The subsets are derived from at least three antennas. Each of the at least three antennas has a field of view and is operative to selectively receive signals from and selectively transmit signals to a satellite in the respective field of view. The method determines, based on the predicted operation, an expected number of switchovers for each of the subsets during the simulated time interval. The method selects a selected subset from the subsets for communicating with the satellite. The selection of the selected subset is based on the expected number of switchovers.

23 Claims, 12 Drawing Sheets

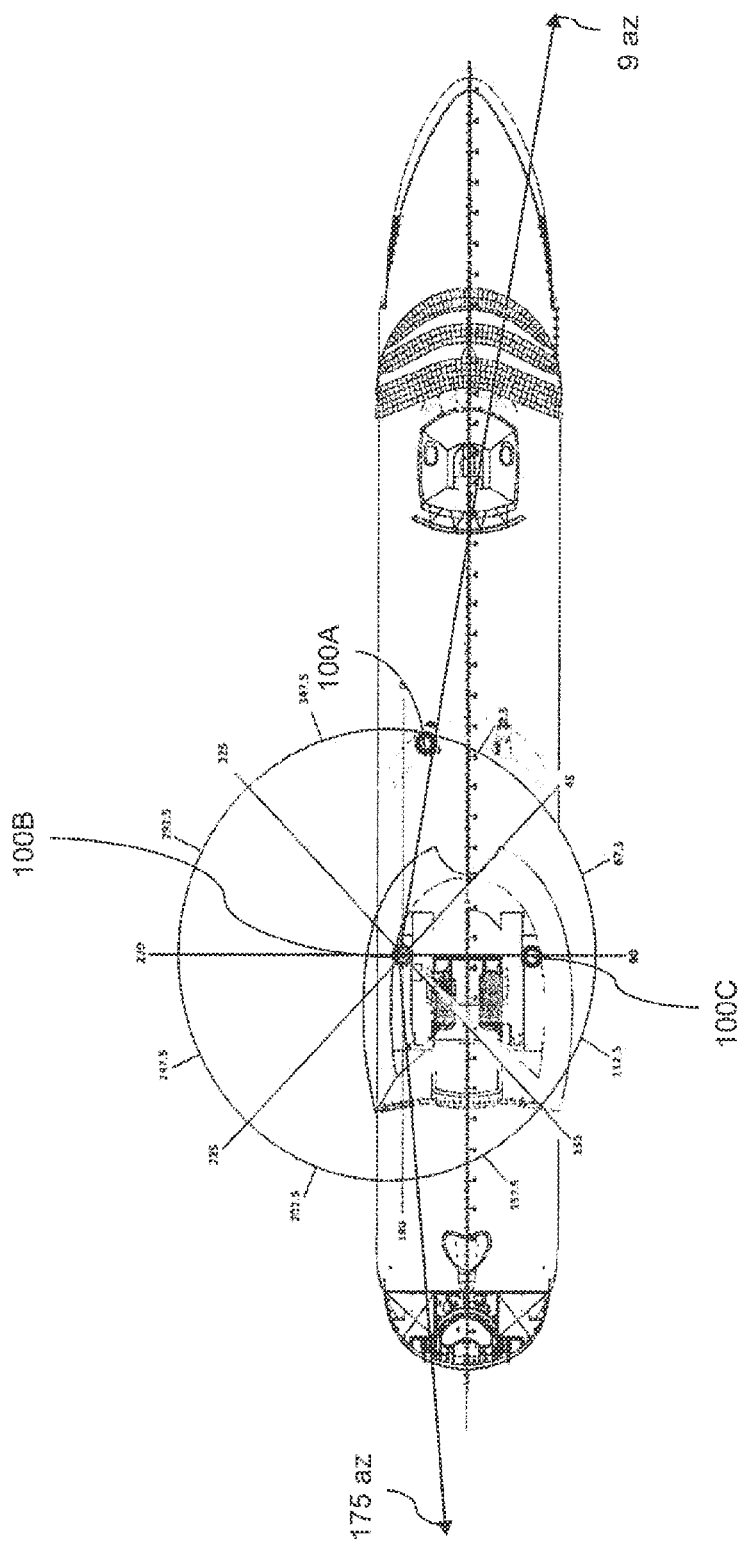

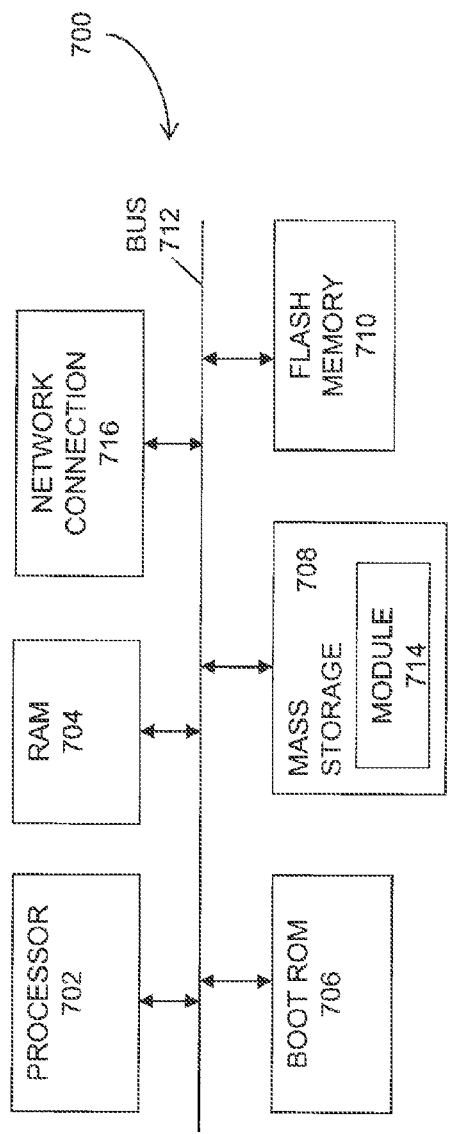
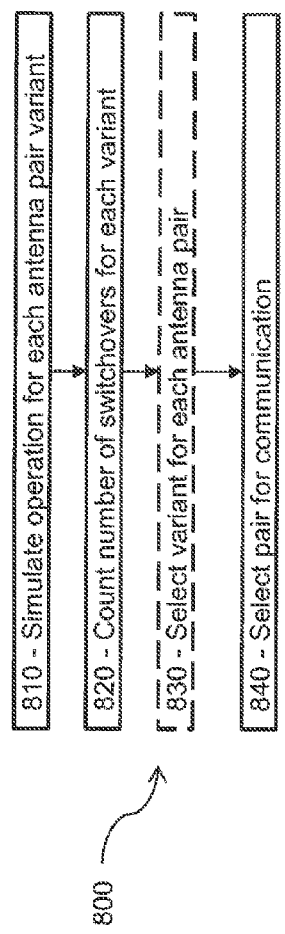
FIG. 7
FIG. 8

| Antenna Blockage Events | | Antenna 100B Status | | Antenna 100C Status | | Switchover Count |
|---|---|---|---|---|---|---|
| Antenna | Blocked? | Configuration | Blocked? | Configuration | Blocked? | |
| 100A | Yes | Primary | No | Secondary | No | 0 |
| 100B | Yes | Secondary | Yes | Primary | No | 1 |
| 100B | No | Secondary | No | Primary | No | 1 |
| 100A | No | Secondary | No | Primary | No | 1 |
| 100C | Yes | Primary | No | Secondary | Yes | 2 |

FIG. 10

METHOD AND SYSTEM FOR SWITCHOVER REDUCTION IN ANTENNAS TRACKING SATELLITES

CROSS-REFERENCE TO RELATED APPLICATIONS

This application claims priority from U.S. Provisional Patent Application No. 62/001,662, filed May 22, 2014, whose disclosure is incorporated herein by reference.

TECHNICAL FIELD

The present invention relates to antennas, and in particular, it concerns antennas tracking a satellite.

BACKGROUND OF THE INVENTION

Satellite communications have made communications accessible and available at any point in time from any point on Earth. Whether at sea, in the air, or on land, modern users demand continuous broadband connectivity for a variety of communications including telephony, internet, and television, as well as monitoring, command, and control. Applications demand various bandwidths and frequencies, as well as real-time, accurate, and quality communications.

In ship based satellite communications, antennas deployed on ships are subject to partial obstructions of the views of the antenna to the satellite(s). These obstructions are typically due to the ship superstructure, and lead to loss of signal and interrupted communications. In the case of communication with non-geostationary satellite constellations, two antennas are typically deployed on a ship and operated in an attempt to overcome such signal loss. Each of the two antennas must maintain a view to a satellite, and are operative to transmit to the satellite when the satellite is in view. When a satellite disappears from the view of one of the antennas, the other antenna must transmit to an appearing satellite in order to maintain signal continuity. However, if any of the antennas are prevented from receiving and transmitting due to obstructions from the ship superstructure, the signal will be lost. Deploying a third antenna on a ship may alleviate such signal loss problems, however, the large size of typical antennas leads to such antennas having larger obstructed views when deploying three or more antennas on a ship.

SUMMARY OF THE INVENTION

The present invention is a method and system for providing a functionality for switchover reduction in antennas tracking satellites.

According to an embodiment of the teachings of the present invention there is provided, a method comprising the steps of: (a) predicting an operation of a predetermined number of subsets of antennas during a simulated time interval, the subsets derived from at least three antennas, each of the at least three antennas having a field of view and operative to selectively receive signals from and selectively transmit signals to a satellite in the respective field of view; and (b) determining, based on the predicted operation, an expected number of switchovers for each of the subsets during the simulated time interval.

Optionally, the method further comprises the step of: (c) selecting a selected subset from the subsets based on the expected number of switchovers.

Optionally, the step of selecting the selected subset is based on which of the subsets has the least number of expected switchovers.

Optionally, the simulated time interval is defined by a first decision point and a second decision point.

Optionally, at least one of the decision points is selected from the group consisting of: a blockage of at least one of the at least three antennas, and a handover.

Optionally, at least two of the at least three antennas has an associated blockage zone.

Optionally, the step of determining of the expected number of switchovers is based on the blockage zone of the at least two of the at least three antennas.

Optionally, the step of predicting comprises: (i) interpolating a trajectory of at least one satellite; and (ii) for at least one of the blockage zones, determining at least one point of intersection of the interpolated trajectory and the at least one blockage zone, and the step of determining uses each of the at least one point of intersection to determine the expected number of switchovers.

Optionally, each of the subsets includes at least a first antenna and at least a second antenna.

Optionally, the operation is a seamless handover of a signal between: (a) a first antenna of a first of the subsets and a first satellite, and (b) a second antenna of the first of the subsets and a second satellite.

Optionally, the step of predicting the operation is based on at least one parameter selected from the group consisting of: a trajectory of the satellite, ephemeris data associated with a satellite, a fault status of each of the at least three antennas, and a combination thereof.

Optionally, each of the at least three antennas is deployed on a ship.

Optionally, the step of predicting is based on at least one parameter selected from the group consisting of: a location of the ship, a heading of the ship, and a combination thereof.

There is also provided according to an embodiment of the teachings of the present invention, a system comprising: (a) a processing unit comprising at least one processor, the processing unit configured to: (i) predict an operation of a predetermined number of subsets of antennas during a simulated time interval, the subsets derived from at least three antennas, each of the at least three antennas having a field of view, each of the at least three antennas for selectively receiving signals from and selectively transmitting signal to a satellite in the respective field of view; and (ii) determine an expected number of switchovers for each of the subsets during the simulated time interval based on the predicted operation.

Optionally, the processing unit is further configured to: (iii) select a selected subset from the subsets based on the expected number of switchovers.

Optionally, the selection of the selected subset is based on which of the subsets has the least number of expected switchovers.

Optionally, the system further comprises: (c) at least three antennas corresponding to the at least three antennas.

Optionally, the at least three antennas are deployed on a ship.

Optionally, at least two of the at least three antennas has an associated blockage zone.

Optionally, the determination of the expected number of switchovers is based on the blockage zones of the at least two of the at least three antennas.

Optionally, the processing unit is further configured to: (iii) interpolate a trajectory of at least one satellite; and (iv) for at least one of the blockage zones, determine at least one point of intersection of the interpolated trajectory and the at least one blockage zone, and each of the at least one point of intersection is used additionally to determine the expected number of switchovers.

Optionally, the processing unit is a controller.

Optionally, each subset includes at least a first antenna and at least a second antenna.

Optionally, each of the subsets includes at least a first antenna and at least a second antenna.

Optionally, the simulated time interval is defined by a first decision point and a second decision point.

Optionally, at least one of the decision points is selected from the group consisting of: a blockage of at least one of the at least three antennas, and a handover.

There is also provided according to an embodiment of the teachings of the present invention, a non-transitory computer-readable storage medium having embedded thereon computer-readable code for reducing switchovers in antennas tracking satellites, the computer-readable code comprising program code for: (a) predicting an operation of a predetermined number of subsets of antennas during a simulated time interval, the subsets derived from at least three antennas, each of the at least three antennas having a field of view and operative to selectively receive signals from and selectively transmit signals to a satellite in the respective field of view; and (b) determining, based on the predicted operation, an expected number of switchovers for each of the subsets during the simulated time interval.

There is also provided according to an embodiment of the teachings of the present invention, a computer program that can be loaded onto a processing unit connected through a network, so that the processing unit running the computer program constitutes a central control unit according to any of the embodiments described in this document.

TERMINOLOGY

The following terms are used in this application in accordance with their plain meanings, which are understood to be known to those of skill in the pertinent art(s). However, for the sake of further clarification in view of the subject matter of this application, the following explanations, elaborations and exemplifications are given as to how these terms may be used or applied herein. It is to be understood that the below explanations, elaborations and exemplifications are to be taken as exemplary or representative and are not be taken as exclusive or limiting. Rather, the terms discussed below are to be construed as broadly as possible, consistent with their ordinary meanings and the below discussion.

Antenna—a component which is configured to transmit signals to and receive signals from a satellite. An antenna has an associated field of view, for which the above mentioned signals are transmitted and received when the satellite is in the field of view of the antenna.

Blockage—an obstruction to the field of view of an antenna. In cases where the antenna is deployed on a ship, such obstructions may be due to the ship superstructure.

Blockage zone—sections of the field of view of an antenna which have blockages. The blockage zone(s) of an antenna are described by ranges of azimuth angle and elevation angle. For example, an antenna deployed on a ship may have a blockage zone between 10-20 degrees elevation and between 320-350 degrees azimuth (possibly due to a ship mast).

Handover—a scheduled process of transferring satellite transmission responsibility from one antenna to another. This process preferably includes a transmission overlap in which two antennas emit signals to a satellite(s) simultaneously such that there is no loss or interruption of communication services.

Seamless handover—a handover in which the transmission overlap involves two antennas emitting signals to two different satellites. Seamless handover processes are scheduled occurrences which are pre-planned in advance with all involved parties (antennas, satellites and associated earth based equipment) anticipating the seamless handover.

Switchover—a non-scheduled process of transferring satellite transmission responsibility from one antenna to another. Switchovers may be induced by various events, including, but not limited to, antenna equipment malfunction and a satellite entering an antenna blockage zone.

Blockage switchover—switchovers induced by blockages of a transmitting antenna's view to a satellite by an obstruction.

Failure switchover—switchovers induced by antenna equipment malfunction.

Tx—a state of an antenna in which the antenna transmits signals to a satellite.

Rx—a state of an antenna in which the antenna receives signals from a satellite.

Tx/Rx—a state of an antenna in which the antenna transmits signals to and receives signals from a satellite.

Tracking antenna—an antenna which is in Rx with a satellite.

BRIEF DESCRIPTION OF THE DRAWINGS

The invention is herein described, by way of example only, with reference to the accompanying drawings, wherein:

FIGS. 4A-4E are schematic representations of blockage zones associated with three ship based antennas;

FIG. 7 is a schematic diagram of a generalized representation of an exemplary processing unit in the form of a controller for controlling components of the systems of FIG. 3 and FIG. 6;

FIG. 8 is a flowchart for selecting an antenna subset according to an embodiment of the invention;

FIG. 10 is a table depicting the incremental blockage switchover count for an antenna subset according to an embodiment of the invention.

DESCRIPTION OF THE PREFERRED EMBODIMENTS

Figure 1A:
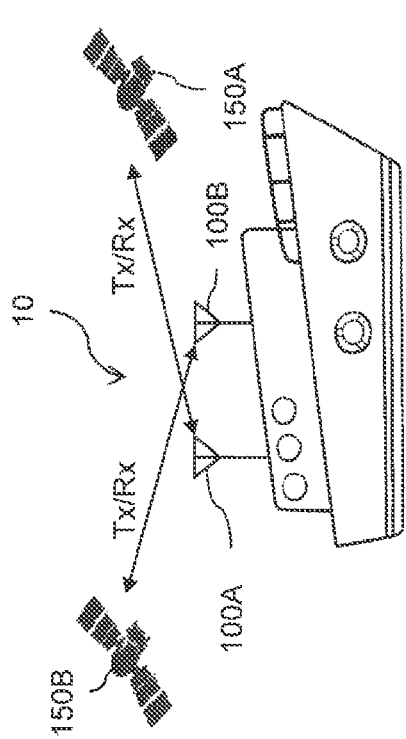
FIGS. 1A-1D are schematic representations of a seamless handover between two antennas and three non-geostationary satellites.

The present invention is a method and system for providing a functionality for switchover reduction in antennas tracking satellites.

The principles and operation of a method and system according to the present invention may be better understood with reference to the drawings and the accompanying description.

The embodiments disclosed herein are applicable to a variety of earth stations in communication with a base station. For simplicity, a preferred embodiment will be described in which the earth stations are implemented as antennas and in which the base station is implemented as a satellite or constellation of satellites. Such a preferred embodiment is non-limiting, and other embodiments may be implemented based on the present description. In the context of this document, the term "antenna" generally refers to a component which is configured to transmit signals to and receive signals from a satellite.

The present embodiments are applicable to satellite communications systems involving earth based antennas and at least one space based satellite, and is of particular value when applied to ship based antennas communicating with non-geostationary satellites. Geostationary satellites have an orbit 35,786 kilometers above the Earth's equator and follow the direction of the Earth's rotation. As such, geostationary satellites appear motionless, at a fixed position in the sky, to an observer on the Earth. Non-geostationary satellites typically orbit the Earth at altitudes above 160 kilometers and below 35,786 kilometers. As such, non-geostationary satellites move across the horizon, ascending and descending, when observed from Earth, appearing and disappearing from the view of an Earth based observer. Non-geostationary satellites include, for example, Low Earth Orbit (LEO) satellites (orbit altitude between 160 kilometers and 2000 kilometers) and Medium Earth Orbit (MEO) satellites (orbit altitude above 2000 kilometers and below 35,786 kilometers).

In order to prevent the interruption of communication services between ship based antennas and ascending and descending non-geostationary satellites, a seamless handover of communications between the ship antennas and the ascending and descending satellites is paramount.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 1B:
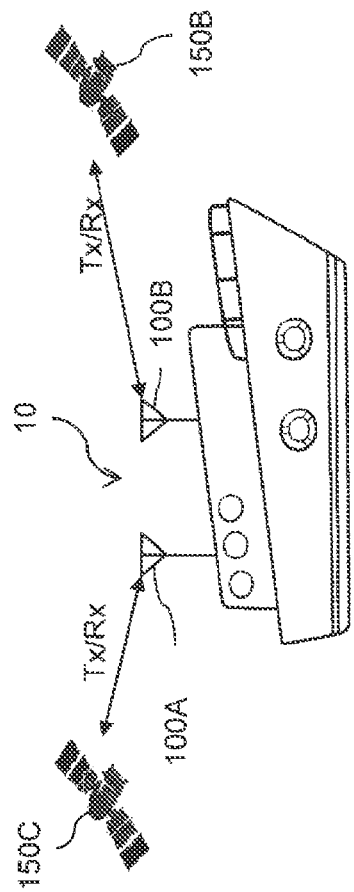
Figure 1C:
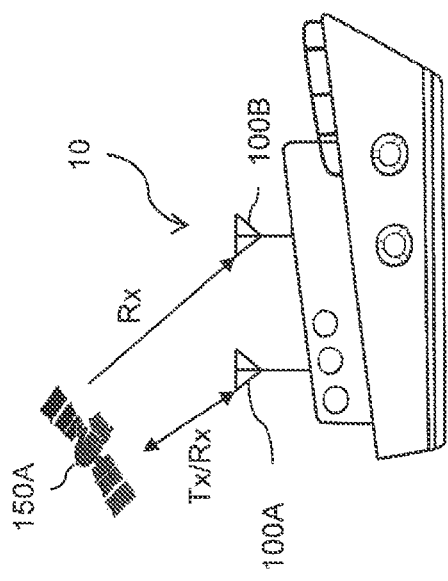
Figure 1D:
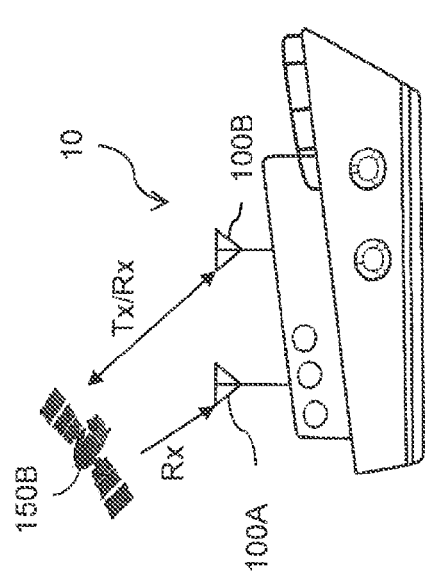
Figure 2:
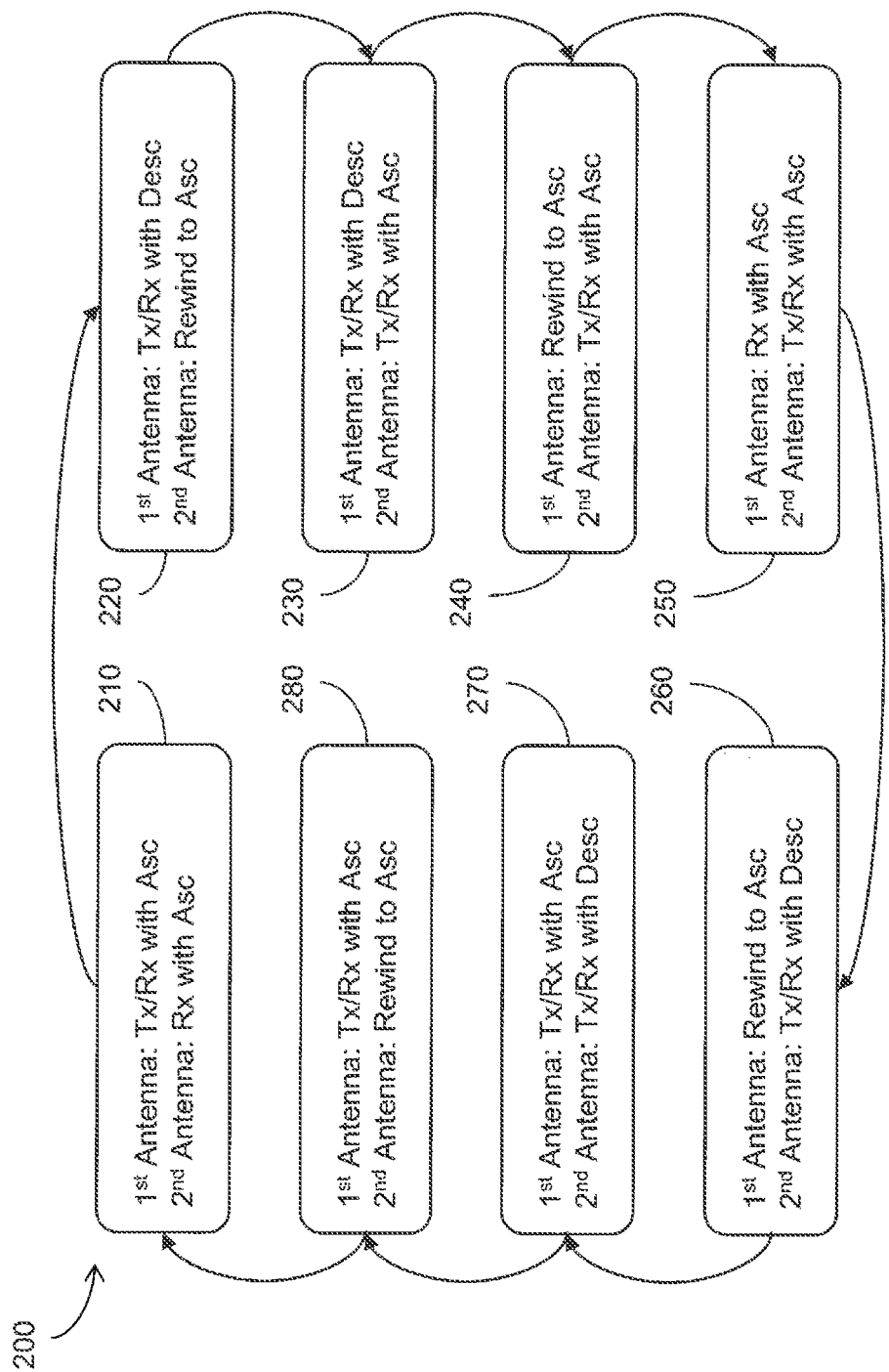
FIG. 2 is a diagram of a state machine corresponding to FIGS. 1A-1D.

Referring now to the drawings, a depiction of an example of handovers, specifically seamless handovers, between a ship based communication system 10 and non-geostationary satellites is shown in FIGS. 1A-2. In the context of this document, the term "handover" generally refers to a scheduled process of transferring satellite transmission responsibility from one antenna to another, and the term "seamless handover" generally refers to a handover in which there is a transmission overlap involving two antennas emitting signals to two different satellites. The system 10 includes two ship based antennas, a first antenna 100A and a second antenna 100B. In the example depicted in FIGS. 1A-1D, there are three such satellites (a first satellite 150A, a second satellite 150B, and a third satellite 150C) orbiting the Earth. Although the example described herein is for a specific number and configuration of satellites, the example should not be taken to limit the handover process described herein to such satellite configurations. Each of the antennas 100A and 100B has a field of view, and is configured to selectively receive signals from and selectively transmit signals to satellites in that field of view. Each of the antennas 100A and 100B is preferably mounted to an antenna mount for adjusting pointing angles of the antenna. The antenna pointing angle adjustment, transmitting, and receiving functionality, as well as the control of such functionality, resides in components of system 10 as will later be described with reference to FIG. 3.

As shown in FIG. 1A, ascending first satellite 150A transmits signals which are received by each of the ship based antennas 100A and 100B. The first antenna 100A transmits signals to and receives signals from the ascending first satellite 150A, while the second antenna 100B only receives signals from the ascending first satellite 150A. As such, the second antenna 100B is Rx with the ascending first satellite 150A, while the first antenna 100A is Tx/Rx with the ascending first satellite 150A.

In the context of this document, the term "Tx" generally refers to a state of antenna in which the antenna transmits signals to a satellite, the term "Rx" generally refers to a state of antenna in which the antenna receives signals from a satellite, and the term "Tx/Rx" generally refers to a state of antenna in which the antenna transmits signals to and receives signals from a satellite.

Refer now additionally to FIG. 2, a handover process 200 between the antennas 100A and 100B. Note that the handover process 200 is an example of a known handover process. The abbreviations "Asc" and "Desc" in FIG. 2 refer to ascending and descending satellites, respectively. When system 10 is in a first state 210, the Tx/Rx configuration of the first antenna 100A and the Rx configuration of the second antenna 100B correspond to the configuration shown in FIG. 1A.

Note that the pointing angle of a tracking antenna is preferably adjusted, either periodically or continuously, in order for the antenna to follow the position of the tracked satellite. The adjusted pointing angle is based on the several parameters, including, but not limited to, a position in the sky of the tracked satellite (e.g. ascension and declination), a longitude and latitude of the ship, a ship heading angle, a ship roll angle, a ship pitch angle and a ship yaw angle. In the context of this document, the term "tracking antenna" generally refers to an antenna which is in Rx with a satellite.

As the first satellite 150A moves across the horizon, the first satellite 150A begins to descend, while a second satellite 150B begins ascending. The descent of the first satellite 150A coupled with the ascent of the second satellite 150B indicates that a handover event will take place. To accommodate the handover, the second antenna 100B stops tracking the first satellite 150A and the pointing angle of the second antenna 100B is adjusted until the second satellite 150B is in the field of view of the second antenna 100B. This action of antenna pointing angle adjustment is referred to herein as rewinding. The rewinding of the second antenna 100B is depicted in a second state 220 of FIG. 2.

In order to achieve a seamless handover, the second antenna 100B is placed in Tx/Rx with the second satellite 150B, while the first antenna 100A continues to be in Tx/Rx with the first satellite 150A, as shown in FIG. 1B. As such, when system 10 is in a third state 230, the Tx/Rx configuration of the first antenna 100A and the second antenna 100B correspond to the configuration shown in FIG. 1C. As the first satellite 150A descends below the horizon, the first antenna 100A stops tracking the first satellite 150A. The first antenna 100A rewinds to point towards the second satellite 150B, as shown in a fourth state 240. Once the first antenna 100A is pointed towards the second satellite 150B, the first antenna 100A is placed in Rx with the second satellite 150B. The second antenna 100B continues to be in Tx/Rx with the second satellite 150B, while the first antenna 100A is in Rx with the first satellite 150A (FIG. 1C). As such, when system 10 is in a fifth state 250, the Rx configuration of the first antenna 100A and the Tx/Rx configuration of the second antenna 100B correspond to the configuration shown in FIG. 1C.

As the second satellite 150B moves across the horizon, the second satellite 150B begins to descend, while a third satellite 150C begins ascending. Similar to as previously described, the descent of the second satellite 150B coupled with the ascent of the third satellite 150C indicates that another handover event will take place. To accommodate the handover, the first antenna 100A stops tracking the second satellite 150B. The first antenna 100A rewinds to point towards the third satellite 150C, as shown in a sixth state 260. Once the first antenna 100A is pointed towards the third satellite 150C, the first antenna 100A is placed in Tx/Rx with the third satellite 150C, while the second antenna 100B continues to be in Tx/Rx with the second satellite 150B, as shown in FIG. 1D. As such, when system 10 is in a seventh state 270, the Tx/Rx configuration of the first antenna 100A and the second antenna 100B correspond to the configuration shown in FIG. 1D. As the second satellite 150B descends below the horizon, the second antenna 100B stops tracking the second satellite 150B. The second antenna 100B rewinds to point towards satellite 150C, as shown in an eight state 280. Once the second antenna 100B is pointed towards the third satellite 150C, the second antenna 100B is placed in Rx with the third satellite 150C. This action returns the antennas to the original configuration of state 210, in which the first antenna 100A is in Tx/Rx with a satellite, and the second antenna 100B is in Rx with the same satellite as the first antenna 100A.

As previously mentioned, the Tx and Rx functionality, as well as control of Tx and Rx functionality, is found in components of system 10 and is described with reference to FIG. 3. The flow of communication signals is indicated by solid arrows and the flow of control signals is indicated by dashed arrows. Furthermore, the communication signals which are received by an antenna from a satellite are annotated by an "RX", whereas communication signals which are to be transmitted by an antenna to a satellite are annotated by a "TX". The signals received by each of the antennas 100A and 100B are provided to demodulators, a first demodulator 102A and a second demodulator 102B, respectively, for demodulation. Note that the received signal quality may be improved by combining the demodulated signals in a structured manner resulting in the in-phase signal summation or bandwidth doubling of the demodulated signals, as described in U.S. Pat. No. 6,593,876.

Baseband signals for uplink transmission are modulated by a modulator 104. The modulated output is fed to a two-way splitter 105 for splitting the modulated signals. Each split modulated signal is fed to block upconverters (BUCs), a first BUC 106A and a second BUC 106B, for converting the modulated signal from lower frequency bands to higher frequency bands. For example, each of the BUCs 106A and 106B may be configured to convert the modulated signals from the L-band (1-2 GHz) to the C-band (3.7-6.8 GHz), Ku-band (10.7-14.5 GHz) or Ka-band (18-31 GHz). The block upconverted signal outputs from the BUCs 106A and 106B are fed to the respective antennas 100A and 100B for potential satellite uplink.

The first antenna 100A has an associated first antenna control unit (ACU) 110A for actuating the uplink transmission of the upconverted signal via the first antenna 100A. Likewise, the second antenna 100B has an associated second antenna control unit (ACU) 110B for actuating the uplink transmission of the upconverted signal via the second antenna 100B The ACUs are also configured to adjust the pointing angles of the associated antenna. A central control unit (CCU) 130 is electrically connected to the ACUs 110A and 110B as well as the demodulators 102A and 102B for providing transmitting and receiving control to system 10. The CCU 130 provides control signals to the ACUs 11A and 110B and the demodulators 102A and 102B based on the state (FIG. 2) of system 10.

For example, note that the states 210 and 250 are steady states during which system 10 preferably operates a majority of the time. As shown in FIGS. 1A, 1C and 2, each of the antennas 100A and 100B track a single satellite, while only one of the antennas transmits to the satellite. As such, in the state 210, the CCU 130 actuates each of the demodulators 102A and 102B to demodulate signals received from the antennas 100A and 100B, respectively. The baseband signals for uplink transmission are modulated by the modulator 104, and fed to the respective BUCs 106A and 106B. The CCU 130 controls the first ACU 110A to actuate the first antenna 100A to uplink transmit the signal from the first BUC 106A. Similarly, in the state 250, the CCU 130 controls the second ACU 110B to actuate the second antenna 100B to uplink transmit the signal from the second BUC 106B.

Figure 3:
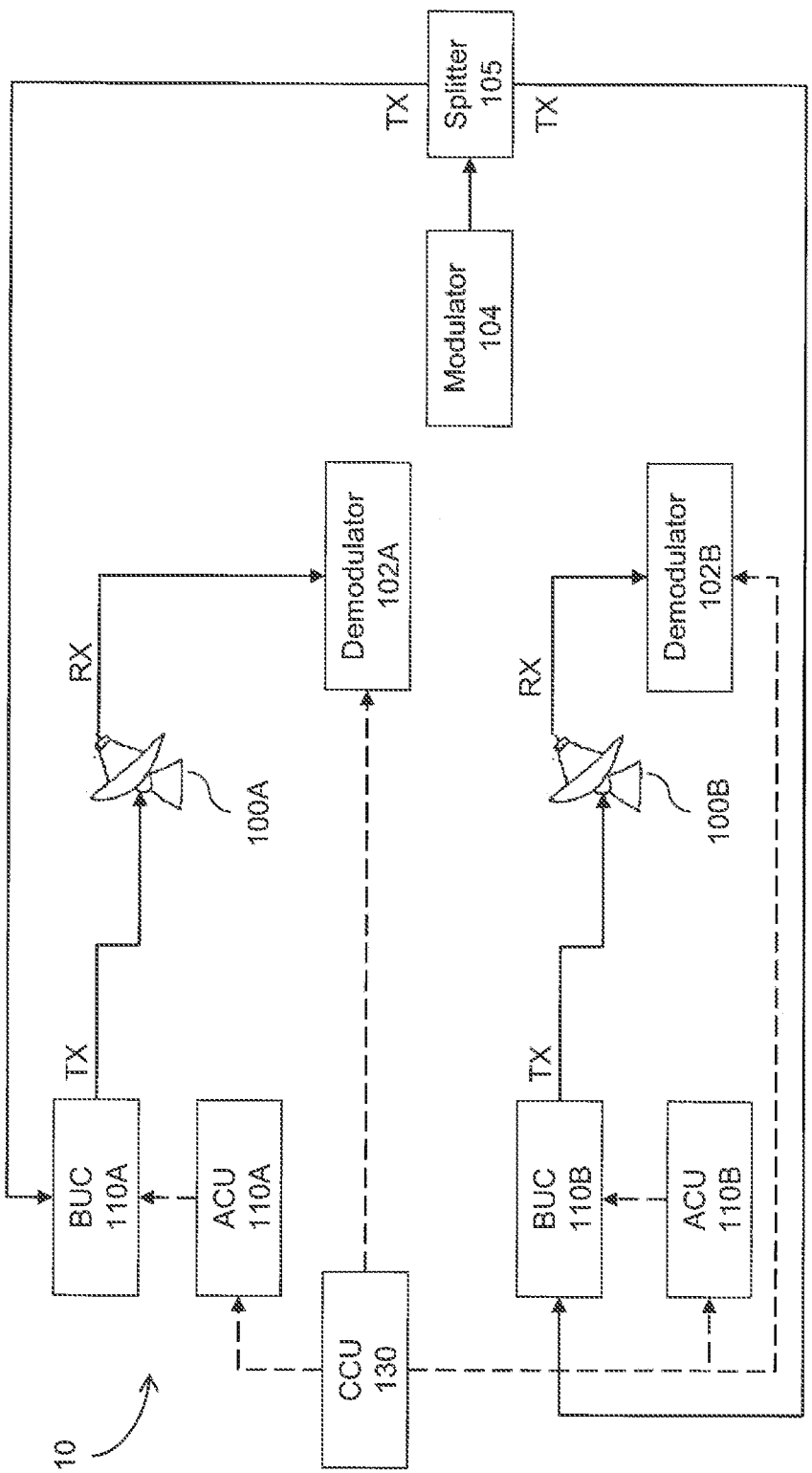
FIG. 3 is a block diagram of a communications system using two antennas.

Note that the block diagram of FIG. 3 is representative of an exemplary implementation of the transmitting and receiving scheme of system 10 and should not be taken to limit the embodiments to the exemplary implementation provided herein. The functionality of individual blocks may be combined with, or separated from, other blocks depending on the implementation and the intended application of the present embodiments. For example, the principle scheme of demodulation and modulation may be alternatively implemented using two demodulators and two modulators, with the modulated output signal of each modulator being fed to a respective modulator prior to being fed to the respective BUCs for each antenna. Although not explicitly shown in FIG. 3, system 10 includes all necessary hardware for transmitting to and receiving from a satellite, including, but not limited to, amplifiers, frequency mixers, filters and low noise amplifiers.

FIG. 7 is a high-level partial block diagram of an exemplary processing unit 700 preferably configured to implement the control functionality of the CCU 130 as previously described. Processing unit 700 includes a processor 702 (one or more) and four exemplary memory devices: a RAM 704, a boot ROM 706, a mass storage device (hard disk) 708, and a flash memory 710, all communicating via a common bus 712. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 702 including but not limited to reduced instruction set computer (RISC) architecture and/or complex instruction set computer (CISC) architecture. Processor 702 can be any number of computer processors, including, but not limited to a microprocessor, an ASIC, a DSP, a state machine, and a microcontroller. A module (processing module) 714 is shown on mass storage 708, but as will be obvious to one skilled in the art, could be located on any of the memory devices.

Mass storage device 708 is a non-limiting example of a non-transitory computer-readable storage medium bearing computer-readable code for implementing the control methodology described herein. Other examples of such computer-readable storage media include read-only memories such as CDs bearing such code. Processing unit 700 may have an operating system stored on the memory devices, the ROM may include boot code for the system, and the processor may be configured for executing the boot code to load the operating system to RAM 704, executing the operating system to copy computer-readable code to RAM 704 and execute the code. Network connection 716 provides communications to and from processing unit 700. Typically, a single network connection provides one or more links, including virtual connections, to other devices on local and/or remote networks. Alternatively, processing unit 700 can include more than one network connection (not shown), each network connection providing one or more links to other devices and/or networks. In the block diagram of system 10 depicted in FIG. 3, the communication between CCU 130 and the demodulators 102A and 102B is implemented via a local area network (LAN).

In embodiments in which the processing unit 700 includes multiple processors 702, the control functionality of each of the CCU 130 and the ACUs 110A and 110B may be implemented on individual processors 702 of processing unit 700. Alternatively, the control functionality of each of the ACUs 110A and 110B may be implemented on unique processing units. Such unique processing units should be understood to be generally similar in overall structure and operation to the processing unit 700 unless stated otherwise, and should be understood by analogy thereto. In such alternative implementations, the communication between the CCU 130 and each of the ACUs 110A and 110B is preferably via a network, such as, for example a LAN.

As previously mentioned, while in the steady states, both of the antennas track a single satellite and only one of the antennas transmits to the tracked satellite. This has the advantage of creating blockage redundancy in situations where one of the antennas becomes blocked by the superstructure of the ship. In the context of this document, the term "blockage" generally refers to an obstruction to the field of view of an antenna. If the transmitting antenna becomes blocked by an obstruction from the superstructure of the ship, a switchover, more specifically a blockage switchover, is initiated by the CCU 130. In the context of this document, the term "switchover" generally refers to a non-scheduled process of transferring satellite transmission responsibility from one antenna to another, and the term "blockage switchover" generally refers to a switchover induced by an antenna blockage. Considering for example the state 210 in which the first antenna 100A is in Tx/Rx and the second antenna 100B is in Rx with the first satellite 150A. Supposing the first satellite 150A enters a blockage zone of the first antenna 100A, the CCU 130 preferably controls the first demodulator 102A to stop demodulating downlink signals from the first satellite 150A. With regard to the uplink of signals to the first satellite 150A, the CCU 130 controls the first ACU 110A to actuate the first antenna 100A to stop uplink transmission of the signal from the first BUC 106A to the first satellite 150A, and controls the second ACU 110B to actuate the second antenna 100B to uplink transmit the signal from the second BUC 106B to the first satellite 150A. In the context of this document, the term "blockage zone" generally refers to a section or sections of the field of an antenna which have blockages.

Note that in addition to the transmission of communication signals, the antennas are configured to transmit GPS 1-pps signals to maintain timing synchronization. As such, the timing critical steps of the above described switchover operation are handled by the respective ACUs of the antennas. Also note that an offshore HUB receives information transmitted by the antennas in order to help coordinate handovers and switchovers with the satellites.

The states 220, 230, 240, 260, 270 and 280 are referred to herein as transition states. In the transition states, each satellite is tracked by at most a single antenna. Considering for example the state 230, the CCU 130 controls the first demodulator 102A to demodulate the signals received from the first satellite 150A, and the second demodulator 102B to demodulate the signals received from the second satellite 150B. The baseband signals for uplink transmission are modulated by the modulator 104. The modulated output is split by the splitter 105 and each of the split signals are fed to the BCUs 106A and 106B. The CCU 130 controls the first ACU 110A to actuate the first antenna 100A to uplink transmit the signal from the first BUC 106A to the first satellite 150A, and controls the second ACU 110B to actuate the second antenna 100B to uplink transmit the signal from the second BUC 106B to the second satellite 150B.

The amount of time system 10 operates in each state is a function of several factors, including the types of antennas used in system 10, as well as the configuration of the satellite constellation with which system 10 is communicating. The amount of time system 10 operates in each of the transition states is typically on the order of a few seconds, and is most typically in the range of 1-6 seconds. The amount of time system 10 operates in the rewind states (220, 240, 260 and 280) when communicating with a typical satellite constellation configuration may be reduced by implementing each of the antennas of system 10 as Orbit OceanTRx™ antenna terminals constructed on the principles of U.S. Pat. No. 8,647,748. The agility of the Orbit OceanTRx™ antenna terminal allows for the antenna terminal to quickly change the antenna pointing angle which facilitates faster rewind capability. In addition to agility, the Orbit OceanTRx™ antenna terminal is relatively compact in size, and as such allows for the installation of more than two antenna terminals on a single ship, without dramatically increasing the blockage zones of the antennas.

Note that although blockage switchovers are non-scheduled, they may be predicted several minutes in advance based on multiple factors such as, for example, the course of the ship, trajectories of the satellites in the constellation, and blockage zones of the antennas on the ship. Since the blockage zones of each of the antennas are based on obstructions of the ship superstructure, the blockage zones for each antenna are known a priori, and therefore may be stored in memory. Preferably, the blockage zones of each antenna are stored in non-volatile memory of the associated ACU. In embodiments in which control functionality of each of the CCU 130 and the ACUs 110A and 110B are be implemented on individual processors 702 of processing unit 700, the blockage zones of each antenna may be stored in the flash memory 710.

As previously mentioned, deployment of a third antenna on a single ship may alleviate the signal loss problems encountered due to handovers, as well as blockage switchovers. Preferably, the antennas are of compact enough size to allow for the combined fields of view of the antennas to cover the field of view to necessary for maintaining signal continuity. As such, at any given time, preferably at least one of the antennas has an unobstructed view to a satellite. As previously mentioned the Orbit OceanTRx™ antenna terminal satisfies the above conditions, and is therefore preferable for deployment on a single ship.

Figure 4A:
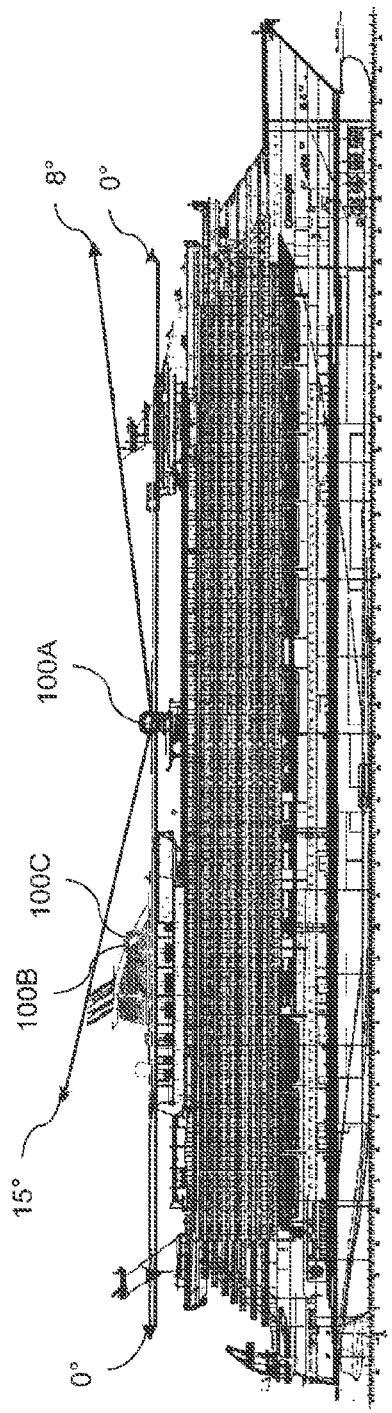
Figure 4B:
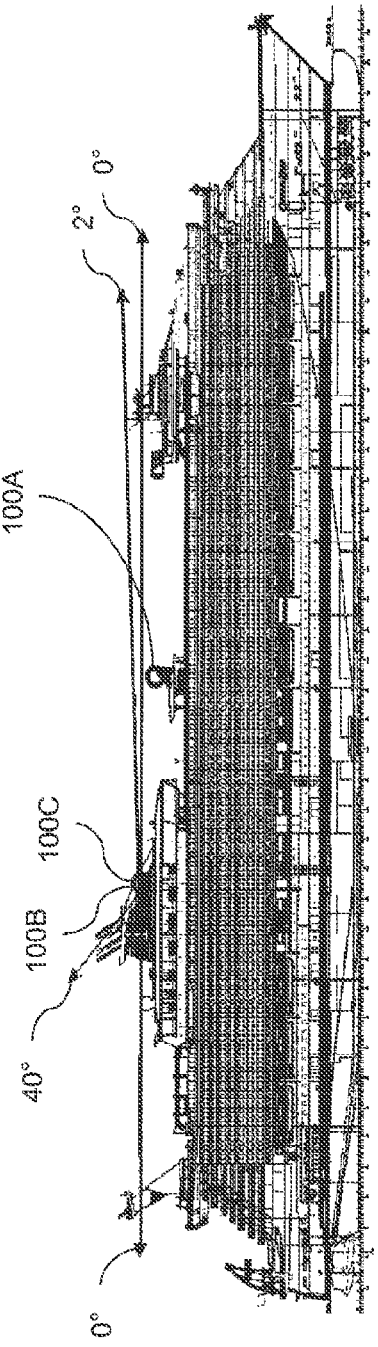

Refer now to FIGS. 4A-4E, a blockage zone for each of three antennas, a first antenna 100A, a second antenna 100B, and a third antenna 100C, in an exemplary three antenna deployment on a single ship. The ship used in the example depicted in FIGS. 4A-4E is an Oasis class ship from Royal Caribbean International cruise ships. FIGS. 4A-4B show the ranges of elevation angles for which the antennas 100A-100C are blocked. As shown in FIG. 4A, the first antenna 100A is blocked in the range of 0-8 degrees when facing towards the ship bow and 0-15 degrees elevation when facing towards the ship stern. Similarly as shown in FIG. 4B, the second and third antennas 100B and 100C are blocked in the range of 0-2 degrees when facing towards the ship bow and 0-40 degrees elevation when facing towards the ship stern. Note that in the deployment depicted in FIGS. 4A-4E, the second and third antennas 100B and 100C are overlaid in FIG. 4B, and thus the second antenna 100B is not clearly visible in FIG. 4B.

Figure 4C:
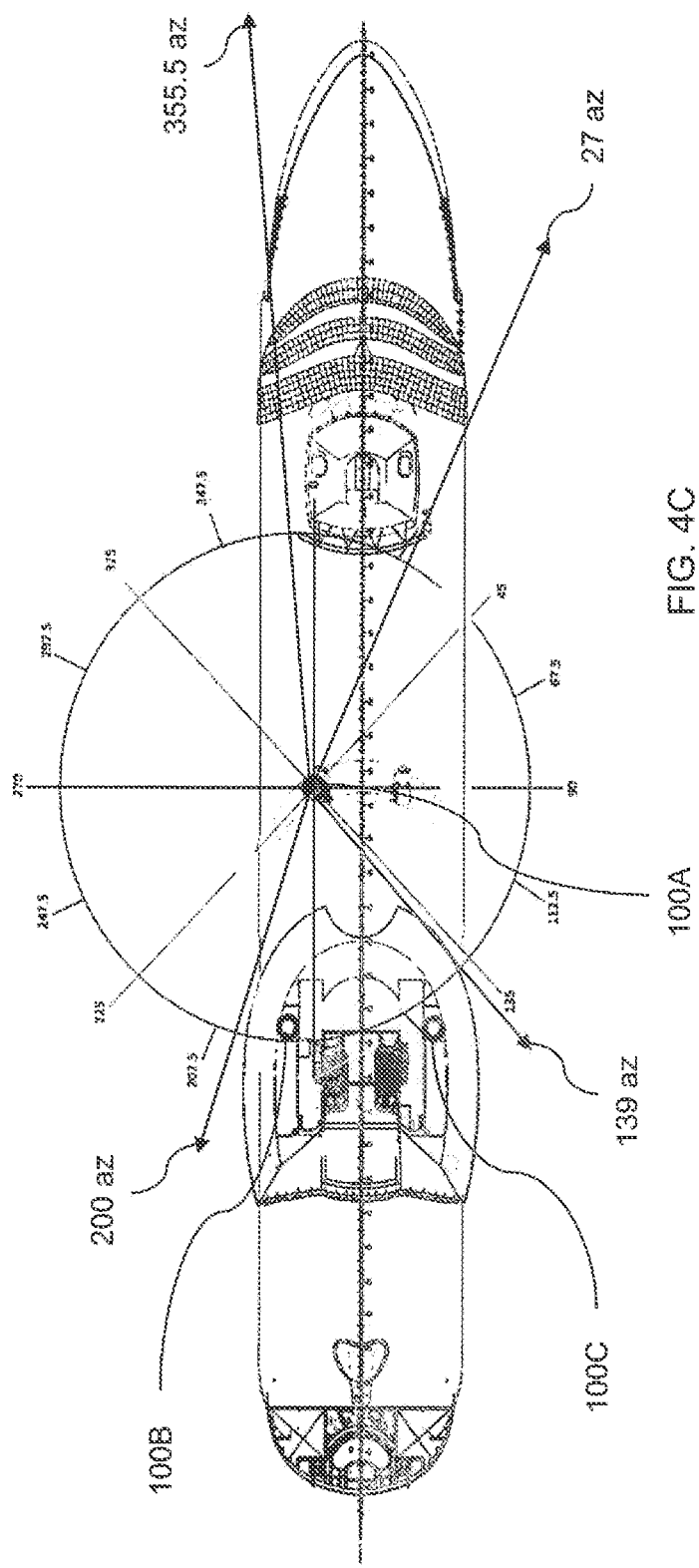
Figure 4E:
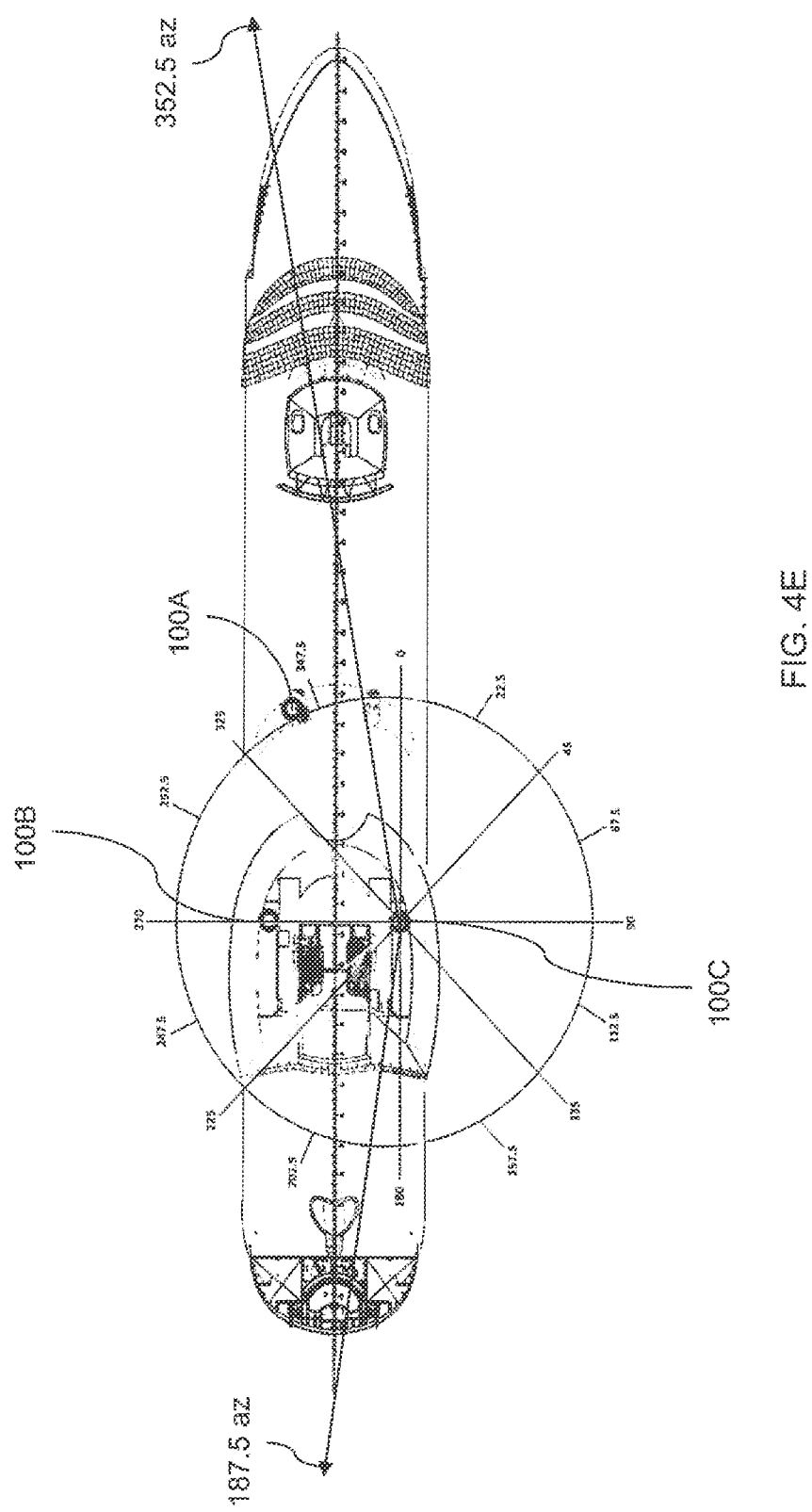

FIGS. 4C-4E show the ranges of azimuth for which each of the three antennas 100A-100C are blocked. As shown in FIG. 4C, the first antenna 100A is blocked in the range of 355.5-27 azimuth and 139-200 azimuth. As shown in FIG. 4D, the second antenna 100B is blocked in the range of 9-175 azimuth. As shown in FIG. 4E, the third antenna 100C is blocked in the range of 187.5-352.5 azimuth. The CCU 130 calculates the azimuth and elevation points for which a satellite enters and exits a blockage zone of one of antennas, as will later be described. As should be apparent, the blockage zones for an antenna may be contiguous or non-contiguous regions of two-dimensional azimuth-elevation space.

Figure 5:
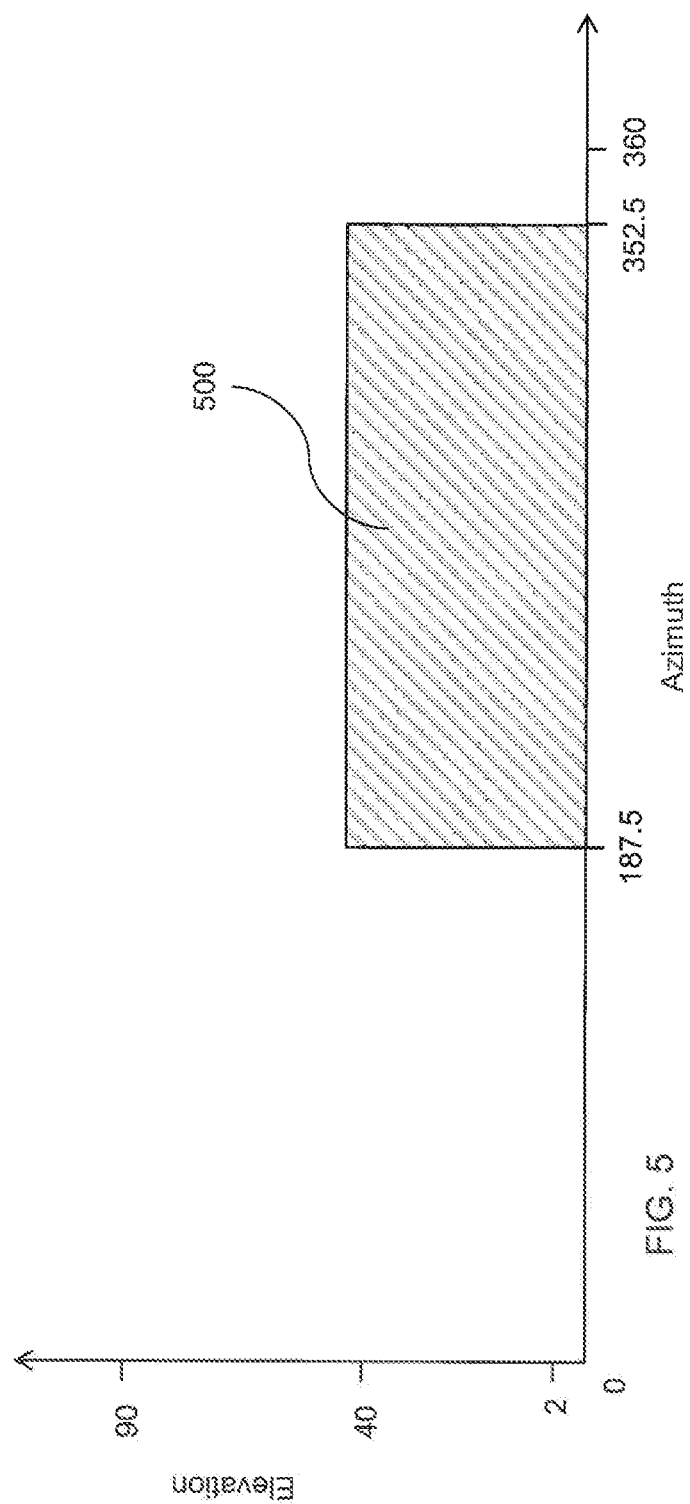
FIG. 5 is an example of a blockage zone of an antenna plotted for elevation and azimuth.

An example of a blockage zone 500 corresponding to the third antenna 100C is depicted as a plot of azimuth versus elevation in FIG. 5. Note that the range of elevation and azimuth for the blockage zone 500 is the same as the elevation range shown in FIG. 4B and the azimuth range shown in FIG. 4E. Note that the plot shown in FIG. 5 is not necessarily drawn to scale, and that the intent of the plot is to more accurately convey the concept of a blockage zone of an antenna in terms of elevation angle and azimuth. Also note that the blockage zone 500 is depicted as a rectangular region of azimuth-elevation space. Although such rectangular depictions may simplify the calculation of the azimuth and elevation points for which a satellite enters and exits a blockage zone of an antenna, blockage zones may be depicted by more precise non-rectangular regions of two-dimensional azimuth-elevation space.

Note that azimuth is determined in reference to a reference vector, most typically true north, which is the direction along the surface of the Earth towards the geographic North Pole. True north is measured as a 0 degree azimuth. However, since the azimuth portion of the blockage zones are functions of obstructions from the ship superstructure, the blockage zone azimuth is most preferably referenced to the ship body reference frame. As such, 0 azimuth corresponds to the angle pointing from an antenna towards the ship bow along the length of the ship. As such, 90 azimuth corresponds to the ship starboard side, 180 azimuth corresponds to the ship stern, and 270 azimuth corresponds to the ship port side.

As previously mentioned, and as will be discussed in more detail below, blockage switchovers may be predicted in advance based on multiple factors such as, for example, the course of the ship, the trajectories of the satellites in the constellation, and the blockage zones of the antennas on the ship. When making such predictions, the blockage zone azimuth is preferably adjusted by the ship course heading angle, in order for the blockage zone azimuth and satellite trajectory azimuth to be in the same reference frame.

In contrast to the two antenna deployment previously described, the three (or more) antenna deployment requires the system to select an antenna subset, namely an antenna pair, for performing the handover and switchover operations. Specifically, an antenna pair should be selected for the operations described by the state machine of FIG. 2 or similar such handovers for different system and satellite constellation configurations, as well as any switchovers required due to blockages or system component failures.

Figure 6:
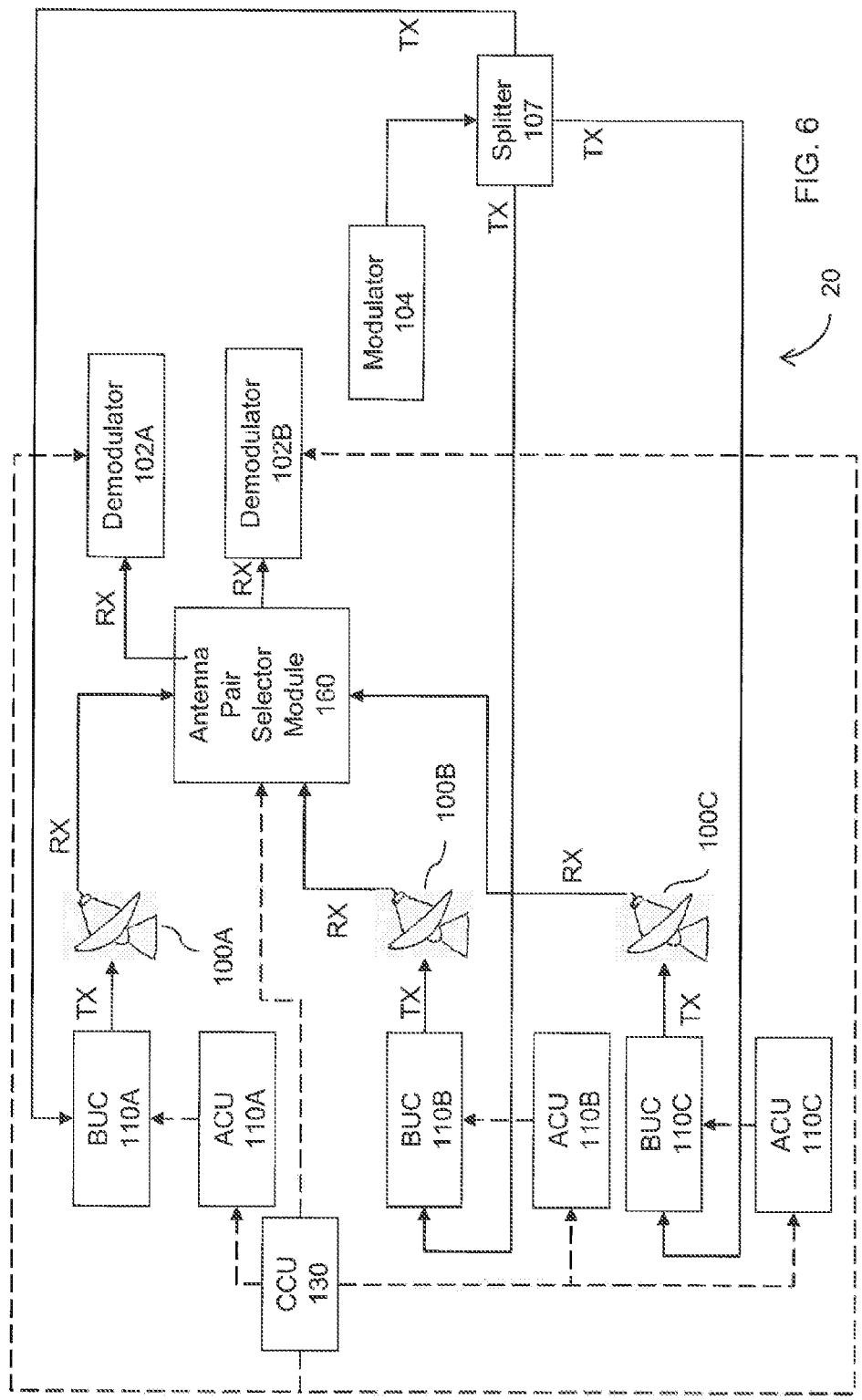
FIG. 6 is a block diagram of a communication system using three antennas according to an embodiment of the invention.

Refer now to FIG. 6, a block diagram of an exemplary embodiment of a communications system 20 including three antennas for communicating with satellites. The flow of communication signals is indicated by solid arrows and the flow of control signals is indicated by dashed arrows. Furthermore, the communication signals which are received by an antenna from a satellite are annotated by an "RX", whereas communication signals which are to be transmitted by an antenna to a satellite are annotated by a "TX". Note that the overall structure and operation of system 20 is generally similar to that of system 10 unless expressly stated otherwise, and will be understood by analogy thereto. A specific feature of system 20 that is different from system 10 is the addition of a third antenna 100C and an antenna pair selector module 160. Also note herein that the structure and operation of the third antenna 100C and its corresponding components is generally similar to that of the antennas 100A and 100B unless expressly stated otherwise, and will be understood by analogy thereto. As such, the combined modulated signal is fed to a three-way splitter 107 for splitting the modulated signal. Each of the split signals is fed to a corresponding BUC. The CCU 130 controls pair selector module 160 such that the received signals from the selected antenna pair are fed into the demodulators 102A and 102B.

Note that the block diagram of FIG. 6 is representative of an exemplary implementation of the transmitting and receiving scheme of system 20 and should not be taken to limit the embodiments to the exemplary implementation provided herein. The functionality of individual blocks and/or modules may be combined with, or separated from, other blocks and/or modules depending on the implementation and the intended application of the present embodiments. For example, the principle scheme of demodulation and modulation may be alternatively implemented using two demodulators and a modulator for each of the antennas, with the modulated output signal of each modulator being fed to the appropriate BUC based on pair selector module 160.

The selection of the antenna pair for operation is based on a simulation and/or a prediction of the behavior of each possible antenna pair. Note that in the exemplary embodiment described with reference to FIG. 6, three antennas are deployed, and as such, there are three possible antenna pairs: Pair 1 (first antenna 100A, second antenna 100B), Pair 2 (first antenna 100A, third antenna 100C), and Pair 3 (second antenna 100B, third antenna 100C). Also note that each antenna pair has two variants. For example, Pair 1 has a first variant of (first antenna 100A, second antenna 100B) and a second variant of (second antenna 100B, first antenna 100A). For the purposes of this description, for each antenna pair the antenna listed in the first position is denoted as the antenna which is in Tx/Rx with a satellite when in steady state, and for simplicity referred to herein as a primary antenna. Similarly, the antenna of the same antenna pair that is listed in the second position is denoted as the antenna which is in Rx with the satellite when in steady state, and for simplicity referred to herein as a secondary antenna.

Refer now to FIG. 8, a flowchart of antenna pair selection process 800. For each variant of each antenna pair, the operation of the antennas of the variant of the antenna pair is simulated in step 810. The simulated time interval over which the simulation is carried out is preferably bounded by decision points, such as, for example, handovers, switchovers, or one of the satellites entering a blockage zone of one of the antennas 100A-100C. As such, for each antenna pair variant, a number of switchovers is counted in step 820 over the duration of the simulated time interval. Most preferably, the number of switchovers counted in step 820 are blockage switchovers. The simulated time interval is preferably dynamic and as such may fluctuate over each individual simulation instance depending on a multitude of factors, such as, for example, the course of the ship, the speed of the ship, and the ship location. For example, if the ship is in port, there may be fewer handovers, and therefore the simulated time interval may be longer than if the ship were to be at sea (moving). Typically, simulated time interval when the ship is at sea is in the range of 20-40 minutes. Note that the simulated time interval may also be preset to a fixed duration, and thereby remain static over individual simulation instances. Also note that although the simulated time interval is on the order of minutes, the amount of time required to run each simulation on a modern computer (such as on the processor 702) is on the order of seconds, and is a function in part on the speed and power of the processor 702. Note that the simulated time interval may be interpreted in other words as a duration interval, a simulation duration, a duration of the simulated time interval, or a duration.

Optionally, for each antenna pair, a variant is selected in step 830 for comparison with the variants of the other antenna pairs. The selection is based on a selection criterion which is a function of the number of switchovers counted in step 820. According to an exemplary implementation, the selection criterion is preferably the variant with the least number of switchovers over the simulated time interval, and is most preferably the variant with the least number of blockage switchovers over the simulated time interval. In alternative implementations, the selection criterion may be the variant with the fewest number of blockage switchovers, or the variant with the minimum number of blockage switchovers. The selected variants of each antenna pair are compared with each other and an antenna pair is selected in step 840 based on the same or similar selection criterion in step 830 discussed above.

Since the above mentioned decision points preferably serve as the boundaries for the simulated time interval, the simulation does not need to be performed continuously. Typically, the elapsed time between simulation instances when the ship is at sea is in the range of 40-60 minutes, and is dependent on various factors, such as, for example, the course of the ship, the speed of the ship, and the ship location. During normal activity, a simulation can be run several minutes prior to a decision point. As a simulation may only take seconds to run, this provides sufficient time to prepare the system for activities after the decision point.

The antenna pair selection process can be carried out by the CCU 130. As previously mentioned, the number of blockage switchovers counted in step 820 by the CCU 130 for each variant of each antenna pair is based on multiple factors such as, for example, the course of the ship, the trajectories of the satellites in the constellation, and the blockage zones of the antennas on the ship.

The CCU 130 determines when the trajectory of the satellite in communication with an antenna pair will intersect with the blockage zones of the antennas. When the trajectory of the satellite intersects with the blockage zone of the primary antenna such that the satellite enters into the blockage zone of the primary antenna, the CCU 130 makes the determination that a blockage switchover will take place, and increases the count of the number of blockage switchovers. This is process is continued over the entire simulated time interval until a total number of blockage switchovers is determined by CCU 130.

Figure 9:
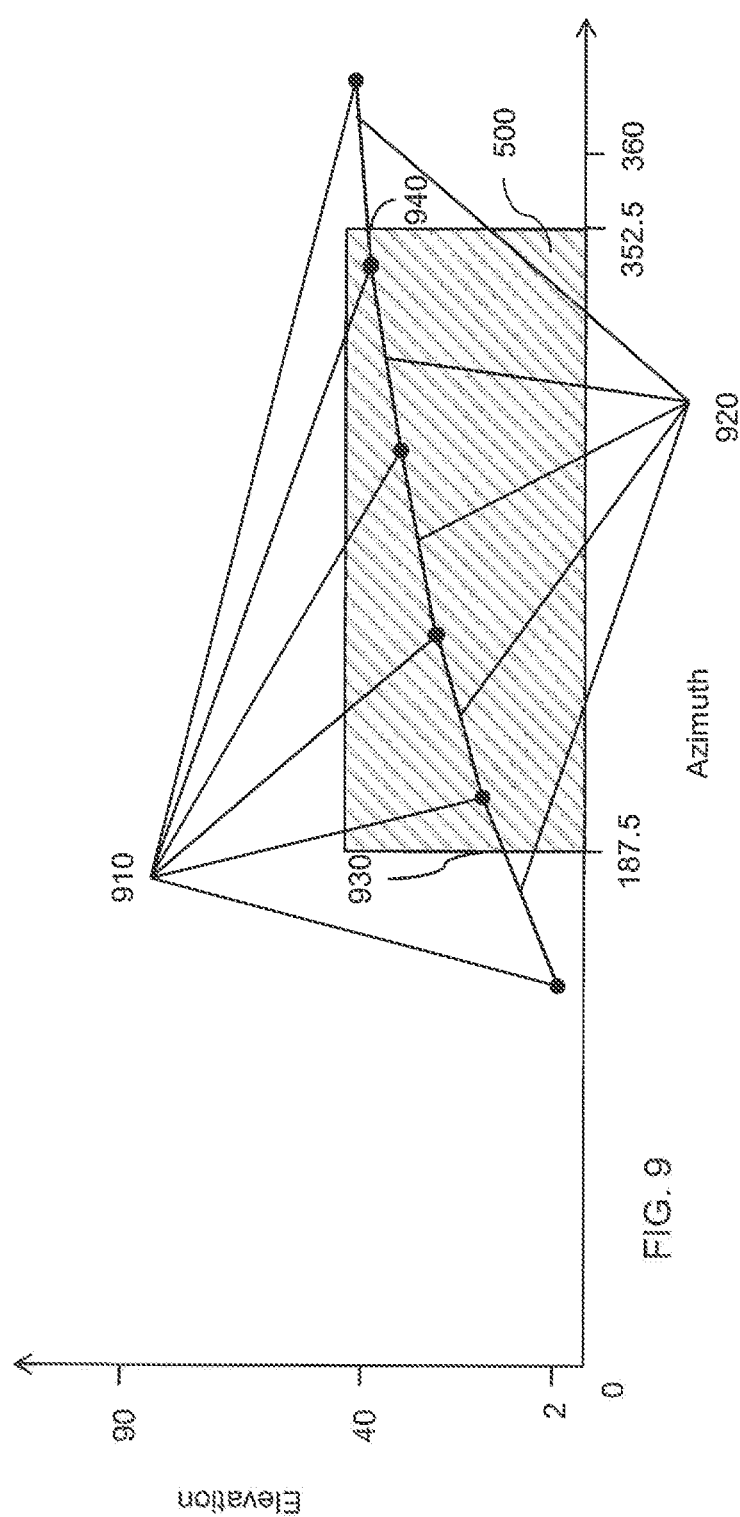
FIG. 9 is an example of interpolated satellite trajectory overlaid on the antenna blockage zone plot of FIG. 5.

Refer now to FIG. 9, an example of the intersection of the trajectory of a satellite with the blockage zone 500 of an antenna. The blockage zone 500 depicted in FIG. 9 is the same as the blockage zone 500 discussed above with reference to FIG. 5.

In practice, the satellite trajectory intersection with an antenna blockage zone is based on satellite trajectory points 910 made available to CCU 130. Satellite trajectory points 910 are typically calculated using simplified perturbations models, such as for example, SDP4, with a two-line element set as input to the model. Since satellite trajectory points 910 are typically discrete trajectory points, the satellite trajectory is interpolated in order to determine the intersections with the antenna blockage zones. Any suitable interpolation algorithm may be used to generate the interpolated satellite trajectory, such as, for example, linear interpolation techniques. Preferably, linear interpolation is used to create interpolated segments 920 between trajectory points 910. The point or points at which the interpolated satellite trajectory enters into the blockage zone of an antenna are referred to as blockage zone entry 930. Similarly, the point or points at which the satellite trajectory exits out of the blockage zone of an antenna are referred to as blockage zone exit 940. The term antenna blockage event refers hereinafter to either a blockage zone entry or a blockage zone exit for an antenna. Note that when a satellite enters the blockage zone of an antenna, the blocked antenna continues to track the satellite using ephemeris satellite data available to the system. This applies to both systems 10 and 20. As such, the blocked antenna continues to adjust its pointing angle based on the ephemeris position data of the tracked satellite.

Refer now to FIG. 10, a table 1000 of an example of the counting step 820 previously described. In the example, the antenna pair for which the switchovers are counted is the first variant of Pair 3 (second antenna 100B, third antenna 100C), with the second antenna 100B initially configured as the primary antenna of Pair 3. As the simulation progresses, a first antenna blockage event occurs, as shown in a first row 1010. The first antenna blockage event corresponds to a blockage zone entry with respect to the first antenna 100A. Since the first antenna 100A is not the primary antenna of Pair 3, the blockage zone entry does not cause a switchover. Subsequently, a second antenna blockage event occurs, as shown in a second row 1020. The second antenna blockage event corresponds to a blockage zone entry with respect to the second antenna 100B. Since the second antenna 100B is the primary antenna of Pair 3, a blockage switchover is executed by the CCU 130 such that the third antenna 100C becomes the primary antenna of Pair 3. The CCU 130 controls the third ACU 110C to actuate the third antenna 100C to uplink transmit the signal from the third BUC 106C to the satellite. The CCU 130 also controls the second ACU 110B to actuate the second antenna 100B to stop uplink transmission of the signal from the second BUC 106B to the satellite. As a result, the number of blockage switchovers is incremented from 0 to 1. At this stage, each of the antennas 100A and 100B are blocked, and the third antenna 100C is the primary antenna of Pair 3.

With continued reference to FIG. 10, subsequent third and fourth antenna blockage events occur, as shown in a row 1030 and a row 1040, respectively. The third blockage event corresponds to a blockage zone exit with respect to the second antenna 100B. The fourth blockage event corresponds to a blockage zone exit with respect to the first antenna 100A. The third antenna 100C remains the primary antenna of Pair 3 for both the third and fourth antenna blockage events. Subsequently, a fifth antenna blockage event occurs, as shown in a row 1050. The fifth antenna blockage event corresponds to a blockage zone entry with respect to the third antenna 100C. Since the third antenna 100C is the primary antenna of Pair 3 and the second antenna 100B is unblocked (row 1030), a blockage switchover is executed by the CCU 130 such that the second antenna 100B becomes the primary antenna of Pair 3. The CCU 130 controls the second ACU 110B to actuate the second antenna 100B to uplink transmit the signal from the second BUC 106B to the satellite. The CCU 130 also controls the third ACU 110C to actuate the third antenna 100C to stop uplink transmission of the signal from the third BUC 106C to the satellite. As a result, the number of blockage switchovers is incremented from 1 to 2.

As previously mentioned, the process of step 820 is carried out for the alternate variant of Pair 3. In this variant, the third antenna 100C begins as the primary antenna of Pair 3, and the second antenna 100B begins as the secondary antenna. The number of switchovers for each of the variants of Pair 1 and Pair 2 are counted similarly to as described above. As previously mentioned, for each antenna pair, the variant of that pair with the smallest number of switchovers over the simulated time interval is selected in step 830 for comparison. The antenna pair variant with the fewest number of switchovers over the simulated time interval is selected in step 840 as the antenna pair for communicating with the satellites. An example of the selections of steps 830 and 840 will now be described, with reference to an example.

Supposing, for example, that over the duration of the simulated time interval the following blockage switchovers are counted for each variant of each antenna pair: Pair 1 first variant—3 blockage switchovers, Pair 1 second variant—4 blockage switchovers, Pair 2 first variant—4 blockage switchovers, Pair 2 second variant—3 blockage switchovers, Pair 3 first variant—2 blockage switchovers, Pair 2 second variant—1 blockage switchovers. As such, in step 830, Pair 1 first variant, Pair 2 second variant, and Pair 3 second variant are selected for comparison, as these are the variants with the least number of blockage switchovers. In step 840, Pair 3 second variant is selected as the antenna pair for communicating with the satellites, as this is the antenna pair with the least number of blockage switchovers compared with the other selected antenna pair variants.

The primary antenna of the selected antenna pair is chosen according to the corresponding variant of the antenna pair. In the above example, the antennas 100A and 100B are selected as the antenna pair for communicating with the satellite, with the second antenna 100B being the primary antenna. Note that the antenna or antennas that are not members of the selected antenna pair continue to track the same satellite that is tracked by the antennas of the selected antenna pair.

If there is a tie among the variants at step 830, the CCU 130 selects one of the variants for the subsequent selection in step 840. This selection may be random, or may be programmed into the CCU 130 memory. For example, if both variants of Pair 1 have four blockage switchovers, the CCU 130 may select either variant for the selection in step 840. Note that if the antenna pair that is currently communicating with the satellites is one of the variants tied for the least number of blockage switchovers, the current antenna pair variant is selected in step 830.

Similarly, if there is a tie among any or all of the antenna pairs in step 840, the CCU 130 selects one of the antenna pairs. This selection may also be random, or may be programmed into the CCU 130 memory. Note that if the antenna pair that is currently communicating with the satellites is one of the antenna pairs tied for the least number of blockage switchovers, the current antenna pair is selected in step 840. This prevents unnecessary switching and control of the components of system 20.

As previously mentioned, step 830 may be optionally individually executed. In implementations in which step 830 is not individually executed, steps 830 and 840 may be combined into a single step, in which a single comparison is made amongst all antenna pair variants. In the previously described example in which there are three antennas, this would yield a single comparison among six antenna pair variants. As previously described, the antenna pair selection criterion may be the antenna pair with the least number of blockage switchovers over the simulated time interval. Alternatively, the selection criterion may be the antenna pair variant with the fewest number of blockage switchovers, or the antenna pair variant with the minimum number of blockage switchovers.

It should be apparent, that as a result of the above described process 800, the number of switchovers during the operation of system 20 can be reduced to the least number of switchovers, or alternatively a minimum number, a smallest number, and/or a fewest number of switchovers. The reduction in switchovers is due in part to the reduced number of blockage switchovers as previously described. The number of failure switchovers may also be reduced by implementing each of the antennas of system 20 as Orbit Ocean-TRx™ antenna terminals constructed on the principles of U.S. Pat. No. 8,647,748. In addition to compact size and agility, such antenna terminals also have higher inherent fault tolerance, and as such are less susceptible to malfunction. However, in situations where one of the antennas 100A-100C has a system fault, that antenna is preferably not selected as a member of the antenna pair for communicating with the satellite until that system fault is cleared. In the context of this document, the term "failure switchover" generally refers to a switchover induced by malfunctioning antenna equipment.

Although the system described thus far has pertained to a ship based communication system having three antennas for communicating with satellites from a non-geostationary satellite constellation, other embodiments are possible in which the number of ship based antennas is greater than three. In such an embodiment, each antenna of the system would include an ACU and a BUC, and the antenna pair selector would select the antenna pair for communicating with a satellite from a larger number of antenna pairs. For example, a ship based communications system having four antennas would yield six possible antenna pairs, with each pair having two variants.

Note that although the system as described thus far has pertained to ship based communication with non-geostationary satellites, the system is equally useful for transferring satellite transmission responsibility from one antenna to another for communication with satellites from geostationary satellite constellations. Although geostationary satellites are at a fixed position in the sky, the motion of the ship may cause antenna blockage events. As such, an antenna pair selection process similar to the process 800 may be used in order to select the antenna pair for communicating with the satellite. Such a process would primarily differ from the process 800 in that the interpolation of the satellite trajectory is not required, as the satellite is at a fixed position in the sky. Similarly, alternative embodiments may include, but are not limited to, antennas deployed on ground based vehicles for communicating with non-geostationary satellites, antennas deployed on ground based vehicles for communicating with geostationary satellites, and antennas deployed for communication with airborne base stations.

It will be appreciated that the above descriptions are intended only to serve as examples, and that many other embodiments are possible within the scope of the present invention as defined in the appended claims.

What is claimed is:

1. A method comprising the steps of:
    (a) predicting an operation of a predetermined number of subsets of antennas during a simulated time interval, the subsets derived from at least three antennas, each of the at least three antennas having a field of view and operative to selectively receive signals from and selectively transmit signals to a satellite in the respective field of view; and
    (b) determining, based on the predicted operation, an expected number of switchovers for each of the subsets during the simulated time interval.

2. The method of claim 1, further comprising the step of:
    (c) selecting a selected subset from the subsets based on the expected number of switchovers.

3. The method of claim 2, wherein the step of selecting the selected subset is based on which of the subsets has the least number of expected switchovers.

4. The method of claim 1, wherein the simulated time interval is defined by a first decision point and a second decision point.

5. The method of claim 4, wherein at least one of the decision points is selected from the group consisting of: a blockage of at least one of the at least three antennas, and a handover.

6. The method of claim 1, wherein at least two of the at least three antennas has an associated blockage zone.

7. The method of claim 6, wherein the step of determining of the expected number of switchovers is based on the blockage zone of the at least two of the at least three antennas.

8. The method of claim 6, wherein the step of predicting comprises:
    (i) interpolating a trajectory of at least one satellite; and
    (ii) for at least one of the blockage zones, determining at least one point of intersection of the interpolated trajectory and the at least one blockage zone, and wherein the step of determining uses each of the at least one point of intersection to determine the expected number of switchovers.

9. The method of claim 1, wherein each of the subsets includes at least a first antenna and at least a second antenna.

10. The method of claim 1, wherein the operation is a seamless handover of a signal between:
    (a) a first antenna of a first of the subsets and a first satellite, and
    (b) a second antenna of the first of the subsets and a second satellite.

11. The method of claim 1, wherein the step of predicting the operation is based on at least one parameter selected from the group consisting of: a trajectory of the satellite, ephemeris data associated with a satellite, a fault status of each of the at least three antennas, and a combination thereof.

12. The method of claim 1, wherein each of the at least three antennas is deployed on a ship.

13. The method of claim 12, wherein the step of predicting is based on at least one parameter selected from the group consisting of: a location of the ship, a heading of the ship, and a combination thereof.

14. A system comprising:
    (a) a processing unit comprising at least one processor, the processing unit configured to:
        (i) predict an operation of a predetermined number of subsets of antennas during a simulated time interval, the subsets derived from at least three antennas, each of the at least three antennas having a field of view, each of the at least three antennas for selectively receiving signals from and selectively transmitting signal to a satellite in the respective field of view; and
        (ii) determine an expected number of switchovers for each of the subsets during the simulated time interval based on the predicted operation.

15. The system of claim 14, wherein the processing unit is further configured to:
    (iii) select a selected subset from the subsets based on the expected number of switchovers.

16. The system of claim 15, wherein the selection of the selected subset is based on which of the subsets has the least number of expected switchovers.

17. The system of claim 14, further comprising:
    (a) at least three antennas corresponding to the at least three antennas.

18. The system of claim 17, wherein the at least three antennas are deployed on a ship.

19. The system of claim 17, wherein at least two of the at least three antennas has an associated blockage zone.

20. The system of claim 19, wherein the determination of the expected number of switchovers is based on the blockage zones of the at least two of the at least three antennas.

21. The system of claim 19, wherein the processing unit is further configured to:
    (iii) interpolate a trajectory of at least one satellite; and
    (iv) for at least one of the blockage zones, determine at least one point of intersection of the interpolated trajectory and the at least one blockage zone, and wherein each of the at least one point of intersection is used additionally to determine the expected number of switchovers.

22. The system of claim 14, wherein the processing unit is a controller.

23. The system of claim 14, wherein each of the subsets includes at least a first antenna and at least a second antenna.

* * * * *